Figure 1:
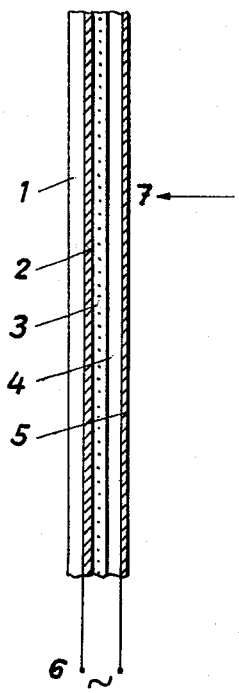

June 20, 1961  A. LIEB  2,989,636
IMAGE CONVERTER
Filed May 16, 1956

INVENTOR
A. LIEB
BY
ATTORNEY

United States Patent Office 2,989,636
Patented June 20, 1961

2,989,636
IMAGE CONVERTER
Albert Lieb, Oberesslingen, Germany, assignor to International Standard Electric Corporation, New York, N.Y., a corporation of Delaware
Filed May 16, 1956, Ser. No. 585,194
Claims priority, application Germany May 20, 1955
9 Claims. (Cl. 250—83.3)

The invention pertains to an arrangement enabling the conversion of an invisible radiation image or of a temperature image, that is, of a plane-shaped temperature distribution, into a visible image. In particular the invention is based on the problem of converting the infra-red radiation and the electromagnetic radiation of the short Hertzian wave range. Arrangements of this kind for infra-red radiation are already known as image converters.

In one conventional type of image converters electrons are released from a photo-emissive layer by the impinging rays, are accelerated by electric fields and are directed by electronic imaging means to a fluorescent screen which becomes luminescent under electron bombardment. The disadvantage of such image converters resides in the fact that the useful range of practical application within the infra-red area covers only a small wave range. As a rule, only infra-red rays with a wavelength of $0.8$–$1.4\mu$ can be represented in this way. Apart from this these image converters still bear the disadvantage of having a complicated structure which makes them uneconomical and expensive to manufacture.

In another type of image converter there is utilized the so-called temperature quenching effect upon the luminescence of a luminous substance. The indicating sensitivity, however, is only a very low one.

Also the temperature-effected change in color of certain chemical substances has already been utilized for indicating infra-red radiation. The substances showing this effect mostly are complex salts, e.g. silver-mercury-iodide. The change in color is the external or outer sign of an allotropic modification change. Image converters operating on this effect are serviceable throughout the entire infrared range. However, since the change in color extends over a large temperature range and, requires relatively long reaction time, such infra-red radiation indicating arrangements are very slow-acting and much too sensitive.

Another type of image converter is characterized in that a material, a so-called photo-electric resistance, which responds to the radiation to be converted by varying the resistance, controls the electrically performed excitation of a luminous substance, hence which shows an electro-luminescence. The imaging capability of such types of image converters in the infrared area, however, is restricted to the wave range from about $0.8$–$6.0\mu$. The far greatest portion of the infra-red wave range, accordingly, cannot be represented. Furthermore, within the infra-red area this method has the added disadvantage that, due to the existing property of the conventional photo-electric resistances, a sufficient sensitivity is only achievable within a very narrow limited infra-red spectral range. With the exception of image converters employing the change in color of certain chemical substances and those ones resting on the temperature quenching effect of a luminous substance, all of the conventional image converters are incapable of representing or making visible a temperature image. The image converters employing the color-change principle, at least are unsuitable for the sensitive indication of a temperature image due to the long reaction time required, and due to the large temperature range in which the change of color takes place. Still more insensitive are those image converters which make use of the quenching effect of the luminescence for the reproduction of an image.

In order now to provide an image converter which allows to reproduce a temperature image with a high degree of sensitivity, and which has a high radiation sensitivity within and in excess of the entire infra-red spectrum, it is proposed by the invention to control the alternating voltage, which excites the luminescence of an electro-luminescent luminous substance, by substances of a high temperature dependence of the dielectric constants. As substances of a high dielectrically constant temperature dependence, some preferred materials include ferro-electric substances, such as alkaline earth titanates, in particular barium titanate and strontium titanate and/or alkaline earth titanate compounds such as barium-strontium-titanate, or compounds of alkaline earth titanates and metallic oxides such as mixtures of barium titanate and lead and zirconium dioxides, and the like.

With these ferro-electric substances there results within a certain temperature range an abrupt change in the dielectric constant. The magnitude of the temperature at which the abrupt changes take place is a property of the substance. Thus, for example, barium titanate exhibits two abrupt changes of the dielectric constants within the range from about 20 and 120° C. The change (or jump) at 120° C. is particularly strong and distinct. In the case of mixtures of substances the change temperature can be varied within wide limits by correspondingly selecting the ratio of mixture. So, for instance, mixtures of barium and strontium titanate with an increasing content of strontium titanate compared with pure barium titanate result in a noticeable reduction of the abrupt change temperature, whereas when adding lead oxide to barium titanate the change temperature of the dielectric constants will rise with an increasing content of lead oxides. This abrupt change of the dielectric constants is utilized by the invention in an advantageous manner for an image converter. Due to the possibility of freely selecting the temperature-sensitive area within wide limits, the image converter is capable of being adapted to the most various conditions. Thus, for example, with an image converter which is supposed to represent or reproduce relatively low temperature bodies, there will be used substances with a low abrupt change temperature.

For the purpose of further increasing the indicating sensitivity the invention contemplates preheating the dielectric layer to a temperature closely below the abrupt change temperature of the dielectric constant, and only to leave the last temperature increase to the infra-red radiation to be converted. The heating may be effected, for example, by radiation, such as infrared radiation, and/or by directly heating the layer electrically.

The dielectric substances of high temperature dependence, as a rule, only absorb a partial range of the spectrum of the radiation to be imaged. The selective range of absorption is variable within certain limits or up to a certain degree by suitably selecting the dielectric substances, the dielectric constants of which have a high temperature dependence. However, more freedom in selecting the range of absorption may be obtained by adding to the radiation-sensitive cell some special substances which have particular radiation absorption properties. By suitable substance additions such as glass powder, soot, layers of spongy platinum metal, which were evaporated in a nitrogen atmosphere, and the like, it is possible to expand the absorption range of the cell and consequently, the indicating range of the image converter to the entire band of the infra-red spectrum and still further.

Furthermore, the invention proposes, in order to achieve a high degree of sharpness of the image, to reduce greatly the heat shunt conductivity of the temperature of the radiation-sensitive cell. This may be effected by the employment of substances with a small heat conductivity and/or by the employment of very thin layers of the heat cell composition, by providing a spacing between these layers and/or by interrupting layers in the transversal direction. Furthermore, for reducing the heat transmission effect, the cell may also be arranged inside an evacuated container.

Figure 2:
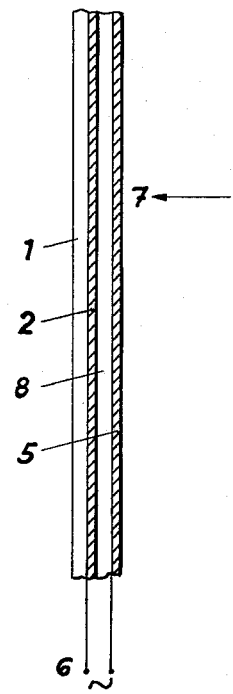
Figure 3:
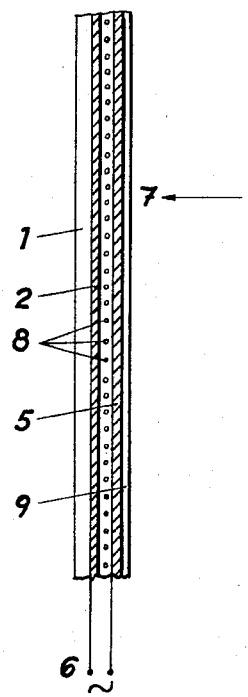
Figure 4:
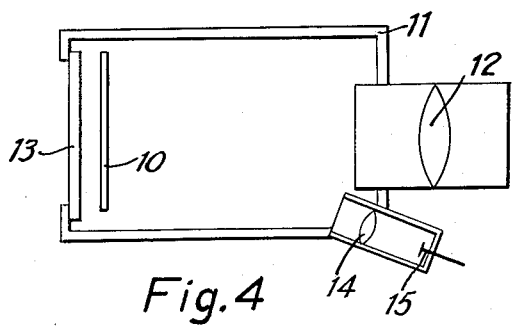

The above-mentioned and other features and objects of this invention and the manner of attaining them will become more apparent and the invention itself will be best understood by reference to the following description of an embodiment of the invention taken in conjunction with the accompanying drawings, in which:

FIGS. 1, 2 and 3 show examples of heat converter cells according to this invention, and FIG. 4 shows an example of a heat converter assembly unit.

In FIG. 1 there is shown an exemplary embodiment of the invention. Onto a suitable support 1, for example, onto a thin mica disk, there is provided an electrically conductive, and preferably transparent, layer 2. The support 1 itself may have the necessary electrical conductivity in which case a layer 2 may be omitted. On the conductive layer 2 there is deposited the electro-luminescence layer of luminous substance 3. The radiation-sensitive layer with the great dependence of the dielectric constant upon the temperature is denoted by 4. This layer 4 is provided with an electrically conductive layer 5 that permits the passage of radiation rays. This conductive layer is very thin and so will not have too great a shunting effect on the radiation sensitive elements. The radiation-sensitive cell is exposed to the radiation from the direction indicated by the arrow 7. Across lines 6 there is applied an alternating voltage for exciting the electro-luminescence.

A modified example of embodiment is shown in FIG. 2. In this example there is provided, instead of the separate electro-luminescence layer 3 and the layer of high dielectric constant-temperature sensitivity, that serves to absorb the impinging radiation, a layer 8 which consists of a mixture of electro-luminescence substance and a radiation-absorbing substance with a high temperature dependence of the dielectric constant.

Another exemplified embodiment, varying from those as shown in FIGS. 1 and 2, is shown in FIG. 3. In this example of embodiment the conductive layer 5, that permits the passage of radiation, is deposited on a support 9. The layer 8 which may be the same as the example of FIG. 2, consists of a mixture of electro-luminescence luminous substance and of a radiation-absorbing substance with a high temperature dependence of the dielectric constant. The substantial difference compared with the example of embodiment as shown in FIG. 2, consists in that the layer 8 does not consist of a continuous, but of individual, interrupted parts. In this way there results the advantage that transversely in relation to the radiation-sensitive cell there exists a reduced heat conductivity. This construction avoids an out-of-focus condition of the image due to a heat shunt conductivity of the radiation-absorbing and electro-luminescence layer which might otherwise occur, depending upon the intensity of the impinging radiation and upon the geometrical arrangement and design of the radiation-sensitive cell.

To the radiation-absorbing layer with a high temperature-dependence of the dielectric constant there may also be added further radiation-absorbing substances. For example, by adding soot, spongy platinum, glass powder, and the like there will be achieved a radiation absorption over the entire infra-red range or even in excess thereof. In the case of the exemplified embodiments according to FIGS. 2 and 3 these additional radiation-absorbing substances are added simultaneously with the electro-luminescence substance and the substance with the high temperature dependence of the dielectric constant.

The radiation-sensitive image converter cell may also be designed in such a way that supports 1 or 9 are not needed. In this case the mechanical stability is obtained by the other layers. This type of embodiment has the special advantage that the shunt conductivity is especially low.

An example of a complete image converter for infra-red radiation is shown in FIG. 4. The radiation-sensitive cell is arranged in a radiation-protected housing 11. This housing may be evacuated in order to reduce the heat transport in transverse direction due to the convection. The radiation-sensitive cell 10 may be constructed in accordance with the exemplified embodiments of FIGS. 1 to 3 or any of the described or suggested modifications. The radiation-protected housing 11 is provided on the rear with a layer 13 that permits the passage of optical radiation. In order to avoid disturbing radiation effects through the layer 13 and into the radiation-sensitive cell of the image converter, this layer 13 is preferably embodied that it prevents the passage of infra-red rays. This layer may consist, for example, of glass, which is a poor conductor of the infra-red. By means of the optic 12 the infra-red radiating body will be imaged on the radiation-sensitive layer 10. This optic 12, in the conventional manner, consists of materials, such as quartz, sodium chloride, and the like, allowing the infra-red rays to pass.

Instead of a lens, there may be employed a mirror (reflector). In such a case there is no appreciable absorption of energy in the imaging optic. Also a mirror in the infra-red area can be designed simpler and without disturbing imaging defects. In addition, the radiation-protected housing 11 contains a radiation source 15 and an image optic 14. By means of this appliance it is possible to achieve a uniform irradiation of the radiation-sensitive cell. The substance with the high dielectric-constants temperature dependence can thus be pre-heated up to the point of abrupt change of the dielectric constants. Another way of pre-heating the radiation-sensitive cell consists in heating the substance by means of an electric current passed through the electrically conductive layers. In order to make visible a temperature image the temperature-sensitive image line may be brought into heat contact with the surface of the body to be imaged.

While the principles of this invention have been described in connection with specific apparatus, it is to be clearly understood that this description is made only by way of example and not as a limitation to the scope of the invention as set forth in the objects thereof and in the accompanying claims.

What is claimed is:

1. An image converter comprising an electro-luminescent material, conductive electrodes on opposite sides of said material, means for applying a variable voltage to said electrodes, and a dielectric material having a critical temperature variable dielectric constant intermediate said electrodes to control the luminescence of said electro-luminescent material.

2. An image converter according to claim 1, wherein said dielectric material is of a type which has an abrupt change in dielectric constant at a predetermined temperature.

3. An image converter according to claim 2, further comprising a source of heat, and means for applying heat from said source to heat said dielectric material to a temperature just below said predetermined temperature.

4. An image converter according to claim 1, wherein said electro-luminescent material and said dielectric material are arranged in layers.

5. An image converter according to claim 4, wherein said dielectric layer is composed of separated individual parts.

6. An image converter according to claim 1, wherein said dielectric material and said electro-luminescent material are mixed together.

7. An image converter comprising an electro-luminescent material, conductive electrodes on opposite sides of said material, means for applying a variable voltage to said electrodes and a dielectric ferro-electric material having a temperature variable dielectric constant intermediate said electrodes to control the luminescence of said electro-luminescent material.

8. An image converter comprising an electro-luminescent material, conductive electrodes on opposite sides of said material, means for applying a variable voltage to said electrodes, and a ferro-electric material comprising alkaline earth titanates or mixtures thereof selected from the group consisting of barium titanate and strontium titanate; positioned intermediate said electrodes to control the luminescence of said electro-luminescent material.

9. An image converter according to claim 8, wherein said ferro-electric material comprises alkaline earth titanates or mixtures thereof selected from the group consisting of barium titanate and strontium titanate mixed with metallic oxides selected from the group consisting of lead dioxide and zirconium dioxide.

References Cited in the file of this patent

UNITED STATES PATENTS

| | | |
|---|---|---|
| 2,572,494 | Krieger et al. | Oct. 23, 1951 |
| 2,648,823 | Kock et al. | Aug. 11, 1953 |
| 2,739,244 | Sheldon | Mar. 20, 1956 |
| 2,755,400 | Stiles | July 17, 1956 |
| 2,773,992 | Ullery | Dec. 11, 1956 |
| 2,780,731 | Miller | Feb. 5, 1957 |
| 2,816,236 | Rosen | Dec. 10, 1957 |

FOREIGN PATENTS

| | | |
|---|---|---|
| 157,101 | Australia | June 16, 1954 |

OTHER REFERENCES

Kazan et al.: "An Electroluminescent Light-Amplifying Picture Panel," Proceedings of the I.R.E., December 1955, pages 1888–1897, page 1891 relied upon.

Destriau et al.: "Electroluminescence and Related Topics," Proceedings of the I.R.E., December 1955, pages 1911–1940, page 1919 relied upon.